United States Patent [19]

Palamara et al.

[11] Patent Number: 4,704,149
[45] Date of Patent: Nov. 3, 1987

[54] HOLLOW FIBER BUSHING TIP

[75] Inventors: Eugene J. Palamara; William L. Schaefer, both of Butler, Pa.

[73] Assignee: PPG Industries, Inc., Pittsburgh, Pa.

[21] Appl. No.: 938,925

[22] Filed: Dec. 8, 1986

Related U.S. Application Data

[63] Continuation-in-part of Ser. No. 818,508, Jan. 13, 1986, abandoned.

[51] Int. Cl.$^4$ ........................................... C03B 37/022
[52] U.S. Cl. ................................................ 65/1; 65/2; 425/133.1; 425/462; 425/DIG. 217
[58] Field of Search ..................... 65/1, 2, 5, 86, 121; 425/133.1, 462, DIG. 217

[56] References Cited

U.S. PATENT DOCUMENTS

| 3,192,023 | 6/1965 | Stalego ........................... 65/2 X |
| 3,257,183 | 6/1966 | Slayter et al. ........................ 65/6 |
| 3,268,313 | 8/1966 | Burgman et al. ..................... 65/5 |
| 3,528,128 | 9/1970 | Murakami et al. . |
| 4,620,859 | 11/1986 | Lin et al. ............................. 65/2 |

Primary Examiner—Robert L. Lindsay
Attorney, Agent, or Firm—John E. Curley

[57] ABSTRACT

A bushing tip suitable for producing hollow fibers is described which is formed from a centrally disposed gas tube preferably integral with the walls of the tip and constructed such that a gas passage is provided through the tip with at least one glass delivery channel is also provided through the tip and around the gas tube. Means are also provided to connect the gas tube to a suitable gas supply.

7 Claims, 7 Drawing Figures

HOLLOW FIBER BUSHING TIP

This application is a continuation-in-part application of Ser. No. 818,508, filed Jan. 13, 1986 now abandoned.

The present invention relates to hollow fibers. More particularly, the present invention relates to bushing orifices and tips used to produce hollow glass filaments. Still more particularly, the present invention relates to a bushing tip having an internal construction suitable for producing hollow glass fibers when used on a fiber glass bushing.

BACKGROUND OF THE INVENTION

In U.S. Pat. No. 3,268,313 assigned to the assignee of the instant invention, a method and apparatus is shown and described for forming hollow glass fibers. In the apparatus shown therein, a plurality of orifices were provided in the bushing bottom for the passage of streams of glass from a molten glass source contained within the bushing Proper. A plurality of hollow tubes were extended into each of those orifices and were arranged substantially concentrically with the respective orifice so that each tube extended beyond the terminus of its respective orifice a fixed distance. In the claims of that patent, this distance was between 0.03 and 0.06 inches. A gas was then introduced into the hollow tube and the annulus surrounding the tube was supplied with molten glass. This method of contacting the glass with gas produces a glass fiber having a central lumen or a hollow center and the glass fibers were then gathered into continuous strand form.

While the apparatus and method described in the aforementioned U.S. patent was satisfactory in that hollow glass fibers were produced, the uniformity of the fibers has been found to be somewhat less than satisfactory. It was found in operating bushings of the type described in the aforementioned U.S. patent, for example, that hollow fibers that were produced changed dramatically over time. It was found that as the bushing bottoms or faceplates were subjected to continuous use, their normal tendency to warp or bow into a slight curvature from end to end occurred just as it does in a normal fiber glass bushing operation. As a result, the gas tube providing gas into the annulus of the bushing tip would remain stationary while the bushing tip itself would move with respect to the walls of that tube, thereby distorting the lumen of the hollow fiber being produced. This rendered the lumen of the fibers no longer concentric since the annulus formed by the bushing tip and the air tubes producing the glass fibers had become distorted from its original concentric orientation. The result of this operation was the production of glass fibers which had erratic K values from fiber to fiber in a given strand. Thus, the strands which were produced contained fibers which had extremely erratic K values and in many instances, glass strands containing large numbers of solid fibers were being produced after the bushing had been operated for an extended period.

In applicant's assignee's co-pending U.S. application Ser. No. 914,428, filed Oct. 2, 1986, a bushing is described which provides for the permanent centering of an air tube in a hollow fiber bushing. In another of applicant's assignee's copending application Ser. No. 914,415, filed Oct. 2, 1986, a bushing is shown having a gas inlet flush with the end of the bushing tip. In still another U.S. patent application Ser. No. 914,436, filed Oct. 2, 1986 by applicant's assignee's, a bushing showing a centering bracket and a gas feed flush with the glass exit of a bushing orifice or tip is shown. Applicants' assignee has described and claimed the improved K value products in copending U.S. application Ser. No. 811,225, filed Dec. 20, 1985. While the above applications accomplish the desired result of producing hollow fibers of greater uniformity, the bushing assembly described in each application is time consuming to assemble.

Thus, a need exists in the art to provide a hollow fiber bushing and bushing tip arrangement which is capable of producing substantially uniform hollow glass fibers as the bushing continues to operate and which is easy to assemble and durable in operation. By substantially uniform glass fibers is meant glass fibers in a multifiber strand which have a central lumen in each fiber defining the internal diameter of the fiber and a more or less uniform outside diameter for each fiber and wherein the average K value of the fibers in the strand (i.e., the ratio of outside diameter to internal diameter) is of a reasonably high value (above 0.5) and few, if any, of the fibers contained in a given strand produced from a multi tip bushing contain solid fibers, i.e., there are less than 10 percent of the total fibers in the strand with K values below 0.5.

SUMMARY OF THE INVENTION

It is an object of the instant invention to provide an improved bushing tip for producing hollow glass fibers.

It is a further object of the invention to provide a bushing tip having an internal configuration conducive to the production of hollow glass fibers.

It is a further object of the invention to provide a bushing tip having an integral gas delivery tube surrounded at least in part by integral molten glass passages through the tip.

A still further object of the invention is to provide a tip having as an integral element therein a gas delivery tube and surrounding glass passages from tip inlet to tip outlet with means at one end of the gas tube to connect it to a gas source.

It is a still further object of the invention to provide a hollow glass fiber forming tip that will produce the same hollow fiber configuration even if the tip is moved from its original orientation by bushing warpage.

Thus, a bushing tip is provided in accordance with the instant invention that can be readily applied to a bushing orifice so that glass can be passed from the bushing through the tip to the atmosphere to form a filament. The tip is characterized by having an internal gas tube integral with the tip throughout its length and concentric with the interior of said tip. The outside surfaces of the gas tube and the inside surface of the tip have at least one passage throughout the length of the tip to permit glass to flow from the bushing to which the tip is attached through the tip to a point outside of the tip. Means are provided at one end of the gas tube to connect it to a gas source so that gas can be passed through the tube to a point outside of the end of the tip.

The invention and other objects thereof will become more apparent to those skilled in the art from the ensuing description of the invention.

BRIEF DESCRIPTION OF THE DRAWING

For a more complete understanding of the present invention, reference is made to the accompanying drawings in which.

DETAILED DESCRIPTION OF THE INVENTION

Figure 1:
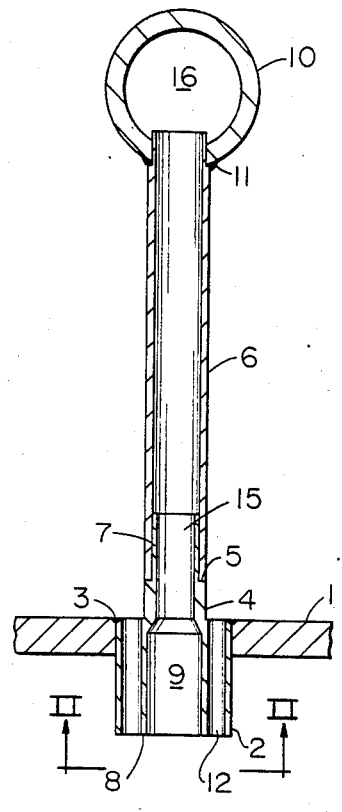
FIG. 1 is a front elevation in section of the bushing tip of the invention and its associated gas supply system.
Figure 2:
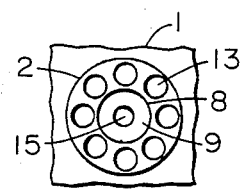
FIG. 2 is a cross section of FIG. 1 taken along lines II-II thereof.
Figure 6:
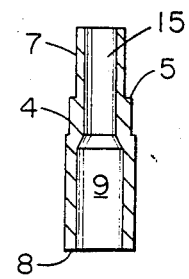
FIG. 6 is a side elevation in section of the gas distribution tube shown in FIG. 1.

Turning to the drawing and FIGS. 1, 2 and 6 in particular, there is shown therein a bushing bottom 1. A bushing tip 2 is welded into the bushing bottom 1 at weld 3. Concentric with the walls of the interior of tip 2 is a tube 8. The tube 8 as shown clearly in FIG. 6 has an upper reduced cross-sectional neck 7 rising above a shoulder 5. Tube 8 has a central gas conduit 15 which in the tip 2 is flared outwardly to form through the length of the tip 2 a chamber 9 through which gas exits the tip 2. This chamber 9 is normally sized to provide the ratio between its diameter and the diameter of the tip 2 itself, which corresponds to the desired K value in the hollow filament being produced. The tube 8 at the end 7 is inserted into the tube 6 which rests on the shoulder 5 of the tube 8. The upper end of the tube 6 is normally welded at 11 to a manifold 10 having a centrally disposed gas conduit 16. The entire assembly is typically placed inside of the bushing and in a multiple tip bushing the manifold 10 would be used to feed gas to several tubes 6 in a row and their associated tubes 8 and tips 2.

In the preferred embodiments of the invention, the tubes 8 and tips 2 are integral. This can be accomplished by casting methods to provide a single unit of the designed configuration or by machining suitable rod stock into the designed configuration. The tube 8 may also be centered in the tip by welding it as an insert into the tip 2. Surrounding the tube 8 in a generally symmetrical pattern are a plurality of circular glass delivery passages 12 exiting from the bushing interior to the exit of the bushing tip 2.

Figure 3:
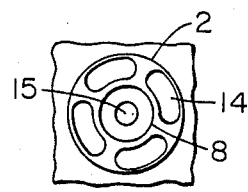
FIG. 3 is a cross section of another configuration of a tip such as shown in FIG. 1.

In FIG. 3, in lieu of the circular passages shown in FIG. 2, four elliptical shaped glass delivery passages are shown surrounding the tube 8 throughout the length of the tip 2.

Figure 4:
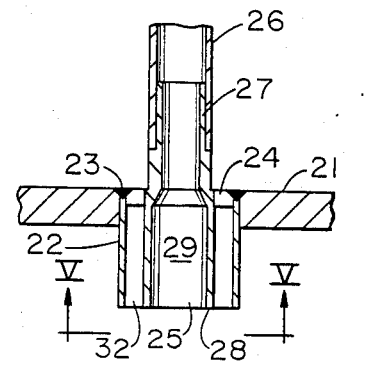
FIG. 4 is a front elevation of another embodiment of a tip of the instant invention.

In FIG. 4 a further embodiment is shown in which a tip 22 is welded at 23 to a bushing bottom 21. The tube 28 has an upper reduced cross-sectional neck 27 shown inserted into a gas delivery tube 26 which is in communication with a gas source (not shown) in a manner similar to that shown in FIG. 1.

Figure 5:
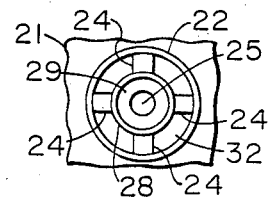
FIG. 5 is a cross-section of the bushing tip FIG. 4 taken along lines V—V.

In FIG. 5 of this further embodiment, the tube 28 has four elongated arms 24 extending outwardly to the interior wall of the tip 22. The arms 24 are welded to the tip 22 at welds 23 shown in FIG. 4. The arms 24 and the inside walls of tip 22 form a plurality of glass passages 32 through which glass flows from the interior of the bushing to the end of tip 22. At the same time that glass is leaving tip 22, gas is injected into it at exit 25 of the chamber 29 located at the end of the tube 28 thus providing the fibers formed by the tip with a hollow center or lumen.

Figure 7:
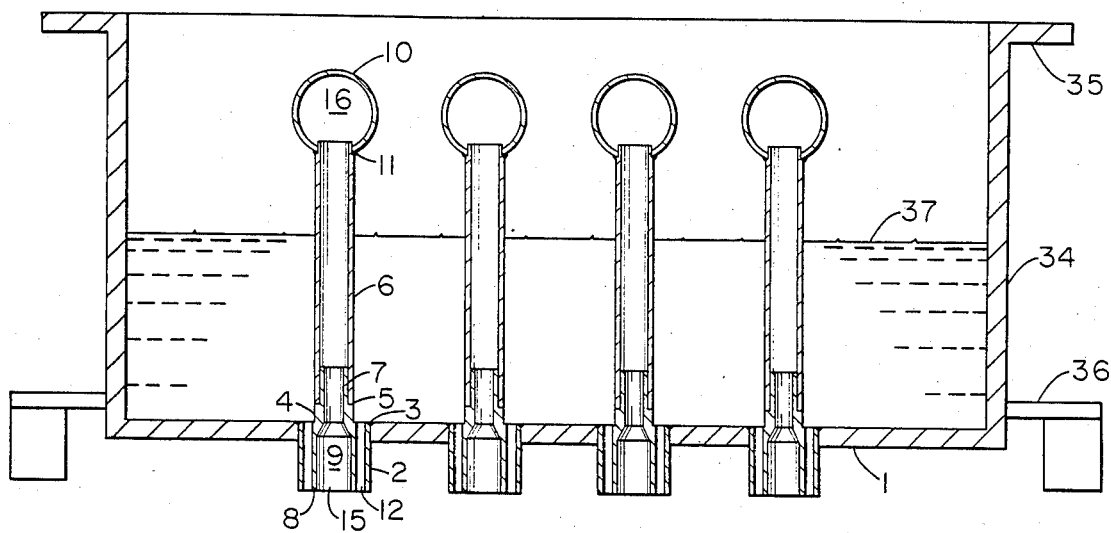
FIG. 7 is a side elevation of a bushing showing four bushing tips and associated gas supply tubes of the invention.

In FIG. 7 a bushing is shown having a bottom 1, sidewalls 34 and a mounting flange 35. The bushing has four tips 2 showing which each contain a centrally disposed gas conduit 8 therein concentric with the interior walls of the tips 2. Each tube or conduit 8 has an upper shoulder 5 and a small cross-sectional upper neck 7 which, as shown, is inserted into a gas delivery tube 6. The tube 6 is sealed fluid tight by weld 11 to a gas manifold tube 10 having a gas passage 16 therein. The bushing is also provided with an electrical connector 36 which can be affixed to a suitable electrical power supply to provide electrical current flow to the bushing for temperature control of the molten glass 37 by resistance heating in a manner conventionally employed by the art. While 4 bushing tips 2 are shown, it will be understood that there may be rows of tips 2 aligned with the distributor tube 10 across the bushing with each of the tips 2 being fed by its own tube 6. Thus, each manifold 10 can be used to feed a plurality of spaced tubes 6 which in turn are centered in tips 2 using the integral spacing of the instant invention.

The important consideration in preparing the tips of the invention is to provide an adequate glass delivery system while anchoring the gas tube in a generally centered location in the tip. The integral tip 2 having the gas tube 8 inside thereof insures that tube 8 will always move in relation to the tip 2 should tip 2 move due to deformation of the bushing and thus the fibers formed will maintain the same configuration despite movement of the tips 2.

The tips and bushings are constructed of conventional metals used for glass fiber making. Thus, precious metals are employed, platinum and platinum-rhodium alloys being typical and 80-20 platinum to rhodium alloys being preferred. Recourse to the use of zirconia stabilized platinum and platinum-rhodium alloys may also be had as can any other alloy of metal suitable for use in a molten glass environment.

The gases used to prepare the hollow fibers can be any gas inert to molten glass such as nitrogen, carbon dioxide, air and the like with air being preferred. The gases are fed through the tubes 8 and 28 of the depicted embodiments at pressure sufficient to form a hollow center in the cone of glass formed at tips 2 and 22 respectively without interrupting the formation of the glass cones at the tips.

While the invention has been described with reference to certain specific illustrated embodiments, it is not intended to be limited thereby except insofar as appears in the accompanying claims.

We claim:

1. A bushing tip for use in producing hollow fiber glass filaments in a fiber glass bushing comprising a tubular bushing tip, a centrally disposed tube running through said tip and concentric with the interior walls of said tip thereby defining a gas passage through the tip, at least one glass exit channel through said tip between the inside wall of the tip and the outside wall of said tube and means firmly attaching said tube to the interior of its associated tip and means to connect said tube to a gas source.

2. A bushing tip for hollow fiber formation comprising a tubular bushing tip, having an integral, centrally disposed gas tube therein and thereby forming a gas passage through said tip, a plurality of glass delivery channels integral with and passing through said tip and surrounding said gas tube and means to connect one end of said gas tube to a gas source.

3. The tip of claim 2, wherein the glass delivery channels are cylindrical channels spaced equidistant from each other around the gas delivery tube and the inside wall of the tip.

4. The tip of claim 1, wherein the said tube is welded to the tip wall.

5. The tip of claim 1, wherein the tube and the tips are formed from the same metal workpiece.

6. The tip of claim 2, wherein the means to connect the tube is an extension of the gas tube rising above the tip.

7. The tip of claim 2, wherein the gas tube opening in the tip and the outside tip diameter are sized to provide a hollow fiber having a fixed ratio of internal to external diameter.

* * * * *